United States Patent Office 3,647,779
Patented Mar. 7, 1972

3,647,779
KASUGAMYCIN SUBSTITUTED ANTIBACTERIAL
AGENTS
Henry Schmitz, Syracuse, N.Y., assignor to Bristol-Myers
Company, New York, N.Y.
No Drawing. Filed May 1, 1970, Ser. No. 33,982
Int. Cl. C07c 47/18
U.S. Cl. 260—210 R                17 Claims

ABSTRACT OF THE DISCLOSURE

5-[2-amino - 2,3,4,6 - tetradeoxy - 4 - substituted-carboxamidino - α - D - arabinohexopyranosyl]-[IR:2S:3S: 4R:5R:6R] - inositols are semi-synthetic kasugamycin derivatives possessing antibacterial properties. The compound 5-[2 - amino - 2,3,4,6 - tetradeoxy-4-(4-piperidylcarboxamidino) - α - D-arabinohexopyranosyl]-[IR:2S:3S: 4R:5R:6R]-inositol has been found to be especially active against gram-negative and gram-positive bacteria, most particularly those of the Pseudomonas genus.

BACKGROUND OF THE INVENTION

Field of the invention

The kasugamycin derivatives of the present invention are compounds particularly useful in the treatment of bacterial infections.

Description of the prior art

The novel compounds of the present invention are derivatives of the antibiotic kasugamycin which is itself commercially available in Japan and which is described in U.S. Pat. No. 3,358,001. Some semi-synthetic derivatives of kasugamycin are described in U.S. Pat. No. 3,480,614. None of the prior art is believed to be anticipatory of the compounds of this invention.

SUMMARY OF THE INVENTION

Compounds having the formula

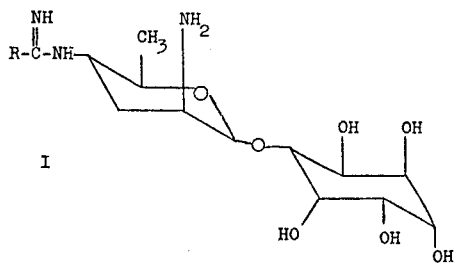

I wherein R is 2, 3 or 4-piperidyl, or 2, 3 or 4-pyridyl; or a pharmaceutically acceptable nontoxic acid addition salt thereof.

COMPLETE DISCLOSURE

This invention relates to new and useful antibiotic substances that are semi-synthetic derivatives of kasugamycin (U.S. Pat. No. 3,358,001). More particularly, it relates to compounds having the formula

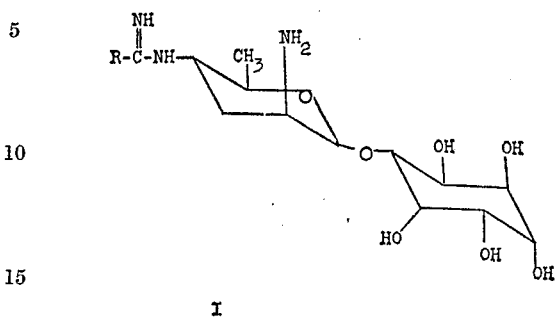

I wherein R is 2, 3 or 4-piperidyl, or 2, 3 or 4-pyridyl; or a pharmaceutically acceptable nontoxic acid addition salt thereof.

The nontoxic salts that are pharmaceutically acceptable include the hydrochlorides, hydrobromides, hydroiodides, (lower)alkylsulfates, lower(alkyl and aryl sulfonates, phosphates, sulfates, maleates, fumarates, succinates, tartrates, citrates, and those others commonly used in the art as salts of amines.

The parent antibiotic substance, kasugamycin, is an effective agent for use in the treatment of infections caused by a variety of bacteria, examples of which are pseudomonas, Klebsiella, Salmonella, Escherichia, Shigella and Brucella. So are the compounds of this invention.

It was an object of the present invention to prepare derivatives of kasugamycin possessing more desirable antibiotic qualities.

The new compounds of the present invention possess a similar spectrum of activity to that of kasugamycin but, in some cases, are substantially more potent.

The most preferred compound of the invention which has the formula

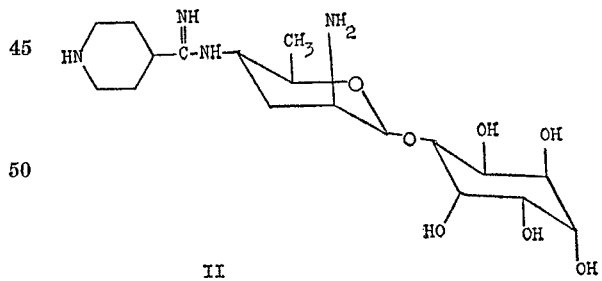

II exhibits more desirable antibiotic activity against various bacteria than does its parent, kasugamycin. The object was achieved, by the provision according to the present invention, of the process for the synthesis of compounds having the formula

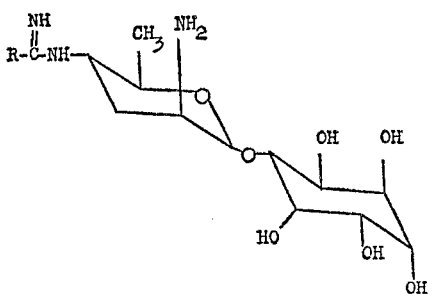

wherein R is 2, 3 or 4-piperidyl, or 2, 3 or 4-pyridyl; which process comprises the consecutive steps of:

Step (A) treating a compound having the formula

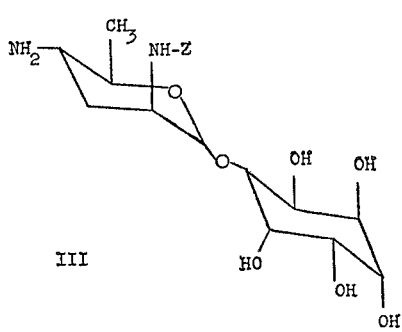

III wherein Z is the ketonic residue having the formula

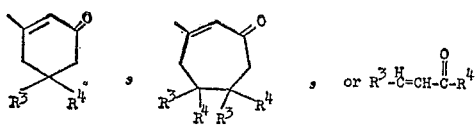

in which $R^3$ and $R^4$ are alike or different and each is hydrogen or (lower)alkyl, but wherein Z is preferably the ketonic residue

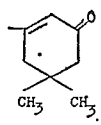

with at least one molar equivalent, but preferably one to four molar equivalents, and most preferably 1.5 to 2 molar equivalents of an imidate having the formula

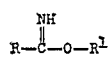

in which R is as defined above and $R^1$ is (lower)alkyl, but preferably methyl or ethyl, and most preferably methyl; or an acid addition salt thereof, in water or a water-miscible organic solvent, or a mixture thereof, organic solvent preferably selected from the group comprising (lower)alkanols, tetrahydrofuran, dioxane, dimethylformamide, formamide, and the like, or mixtures thereof, at a temperature in the range of about −10° C. to about 120° C., but preferably in the range of about 20° C. to about the reflux temperature of the solvent system employed, to produce a compound having the formula

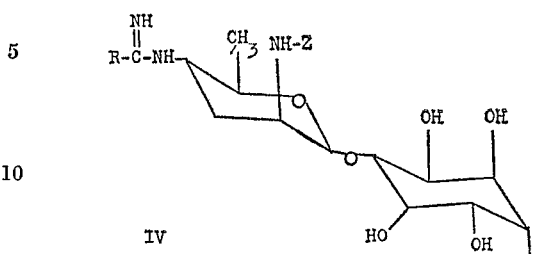

IV wherein R and Z are as defined above; and

Step (B) mixing an aqueous solution of compound IV with an excess of saturated bromine water at about 0° C. to about 40° C., but preferably at about room temperature (20–30° C.) to produce the compound of Formula I.

Sometimes, for ease of production, it may be more desirable to prepare the imidate of the unsaturated heterocyclic oxime, i.e., R is 2, 3 or 4-pyridyl. In this case, when it is desirable to have a saturated R substituent on compound I, an additional step is used in the process of preparation, e.g.:

Step (C) hydrogenating the compound having the formula

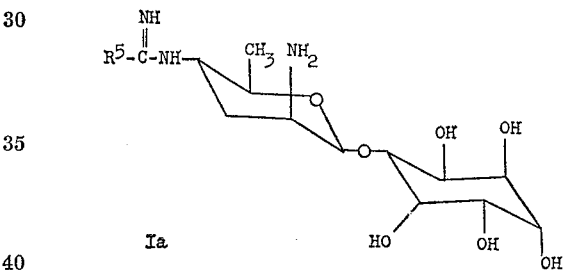

Ia wherein $R^5$ is 2,3 or 4-pyridyl; or an acid addition salt thereof, using a metal catalyst selected from the group comprising palladium oxide or platinum oxide, and the like, or these metals suspended on carbon, but preferably 10% palladium on carbon, in water or a water-miscible organic solvent containing hydrochloric acid of approximately 0.1 N concentration, or mixtures of both, said organic solvent selected from the group comprising (lower)alkanols, tetrahydrofuran, dioxane, dimethylformamide, formamide and the like, or mixtures thereof, but preferably water, methanol or ethanol, or mixtures thereof, at about atmospheric pressure or above, but preferably at about 10 to about 200 lb./in.², and most preferably at about 50 lb./in.² to produce the compound having Formula Ib wherein $R^6$ is 2,3 or 4-piperidyl (see structure below).

An alternate process of preparation may also be used for the preparation of the saturated R substituted compounds (Ib) of the instant invention, i.e., compounds having the formula

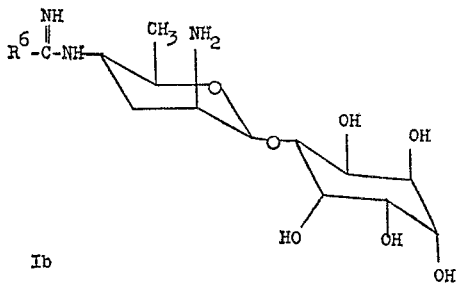

Ib in which $R^6$ is 2,3 or 4-piperidyl.

The alternate process for the preparation of compounds having the Formula Ib comprises the consecutive steps of (A) mixing a compound having the formula

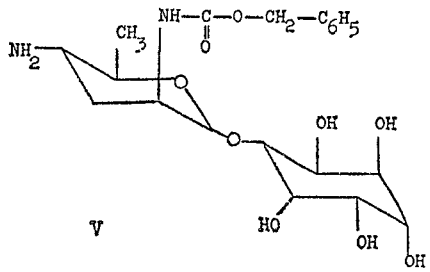

V with an aldoxime halide of the formula

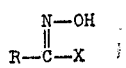

in which R is 2, 3 or 4-piperidyl, or 2, 3 or 4-pyridyl, and X is chloro, bromo or iodo, but preferably chloro; in a ratio of at least one molar equivalent of aldoxime halide per mole of compound V, but preferably in a ratio of about 1 to about 2 moles of aldoxime halide per mole of compound V, and most preferably in a ratio of about 2 moles of aldoxime halide per mole of compound V, in a (lower)alkanol, preferably methanol or ethanol, in the presence of a tertiary amine, preferably trimethylamine or triethylamine at a temperature in the range of about 0° C. to 5° C., to produce the compound having the formula

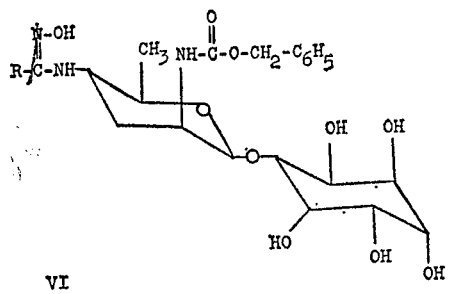

VI wherein R is as described above; and

Step (B) hydrogenating compound VI at a pressure above atmospheric pressure, but preferably at about 10 lb./in.² to about 200 lb./in.², and most preferably at about 50 lb./in.², in the presence of a catalytic metal selected from the group comprising platinum, palladium, nickel and the like, but preferably palladium, in water acidified with hydrochloric acid in about 0.1 N to about 0.5 N concentration, and most preferably in about 0.1 N to 0.2 N concentration to produce compound Ib.

Still another alternative procedure may be followed for the preparation of the compounds of Formula Ib. This procedure comprises the consecutive steps of (A) mixing a pyridinealdoxime halide having the formula

in which R and X are as previously defined above, with a compound of Formula III, but wherein Z is preferably the ketonic residue

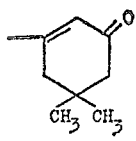

in a ratio of at least one molar equivalent of aldoxime halide per mole of dimedone, but preferably in a ratio of about 1 to about 2 moles of aldoxime halide per mole of dimedone, and most preferably in a ratio of about 1.0 to about 1.2 moles of aldoxime halide per mole of dimedone, in a (lower)alkanol, preferably methanol or ethanol, in the presence of a tertiary amine, preferably trimethylamine or triethylamine, at a temperature in the range of about 10° C. to about 60° C., but preferably at about 15° C. to about 35° C., and most preferably at about 25° C., to produce the compound having the formula

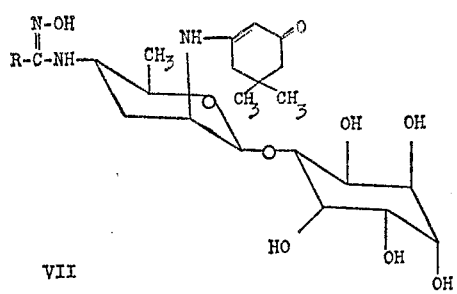

VII in which R is as previously defined; and (B) Treating compound VII, dissolved in a minimum quantity of water, the solution adjusted to a pH in the range of about 3 to about 6, but preferably about 5.5, said pH adjusted with hydrochloric acid, with saturated bromine water until the yellow color persists, at a temperature in the range of 10° C. to about 45° C., but preferably at about 25° C., to produce the compound having the formula

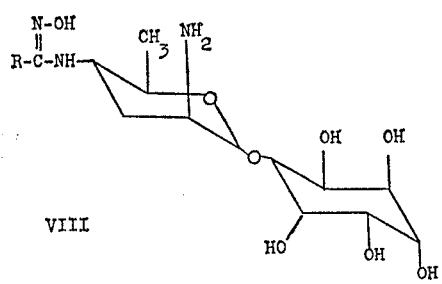

VIII in which R is as previously defined; and (C) Hydrogenating compound VIII using a metal catalyst selected from the group comprising palladium oxide or platinum oxide, and the like, or these metals suspended on carbon, but preferably 10% palladium on carbon, in water or a water-miscible organic solvent, or mixtures of both, said organic solvent selected from the group comprising (lower)alkanols, tetrahydrofuran, dioxane, dimethylformamide, formamide and the like, or mixtures thereof, but preferably water, methanol or ethanol, or mixtures thereof, at about atmospheric pressure or above, at an acidic pH to produce compound Ib.

The term "(lower)alkyl" as used herein shall be defined as including both branched and straight chain hydrocarbon radicals having from 1 to 8 carbon atoms such as methyl, ethyl, n-propyl isopropyl, n-butyl, isobutyl, t-butyl and the like.

When the term "(lower)" is used in connection with another term, e.g., (lower)alkanol, it means an alcohol with a carbon chain of 1 to 8 carbons. A preferred embodiment of the present invention is a compound having the formula

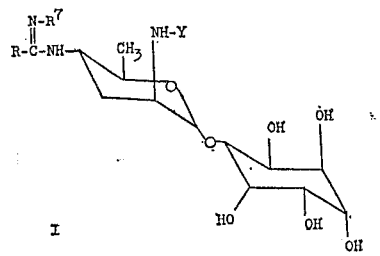

I wherein R is 2,3 or 4-piperidyl, or 2, 3 or 4 pyridyl; Y is hydrogen or a radical of the formula

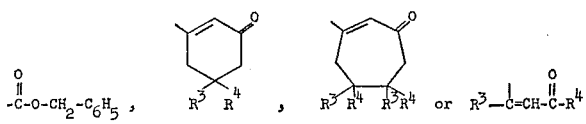

in which $R^3$ and $R^4$ are alike or different and each is hydrogen or (lower)alkyl; and $R^7$ is hydrogen or —OH; or a pharmaceutically acceptable and acid addition salt thereof.

Another preferred embodiment is the compounds of Formula I wherein Y and $R^7$ are each hydrogen.

A more preferred embodiment is the compounds of Formula I wherein Y and $R^7$ are each hydrogen and R is 3 or 4-piperidyl, or 3 or 4-pyridyl.

A most preferred embodiment is the compounds of Formula I wherein Y and $R^7$ are each hydrogen and R is 4-piperidyl or 4-pyridyl.

Another most preferred embodiment is the compounds of Formula I wherein Y and $R^7$ are each hydrogen and R is 4-piperidyl; or a mono-, di-, or trihydrochloride salt thereof.

A preferred embodiment of the present invention is the compounds of Formula I wherein Y is a radical of the formula

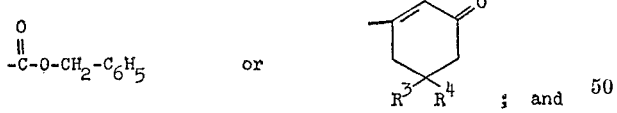

$R^7$ is hydrogen or —OH.

A more preferred embodiment is the compounds of Formula I wherein Y is a radical of the formula

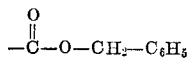

and $R^7$ is hydrogen.

Another most preferred embodiment is the compounds of Formula I wherein Y is a radical of the formula

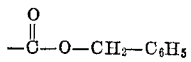

and $R^7$ is —OH.

A more preferred embodiment is the compounds of Formula I wherein Y is a radical of the formula

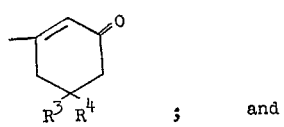

$R^7$ is hydrogen.

Another most preferred embodiment is the compounds of Formula I wherein Y is a radical of the formula

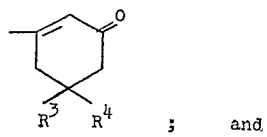

$R^7$ is hydrogen.

Another most preferred embodiment is the compounds of Formula I wherein Y is a radical of the formula

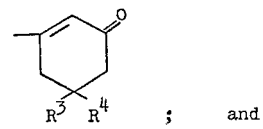

$R^7$ is —OH.

A preferred embodiment of the present invention is the compounds of Formula I wherein Y is hydrogen and $R^7$ is —OH.

A more preferred embodiment is the compounds of Formula I wherein Y is hydrogen, $R^7$ is —OH and R is 3 or 4-piperdyl, or 3 or 4-pyridyl.

A further preferred embodiment is the compounds of Formula I wherein Y is hydrogen, $R^7$ is —OH and R is 4-pyridyl or 4-piperidyl.

A most preferred embodiment is the compound of Formula I wherein Y is hydrogen, $R^7$ is —OH and R is 4-pyridyl.

Another most preferred embodiment is the compound of Formula I wherein Y is hydrogen, $R^7$ is —OH and R is 4-piperdyl.

PREPARATION OF STARTING MATERIALS (A) Preparation of the carbobenzoxy derivatives of kasugamycin (IX):

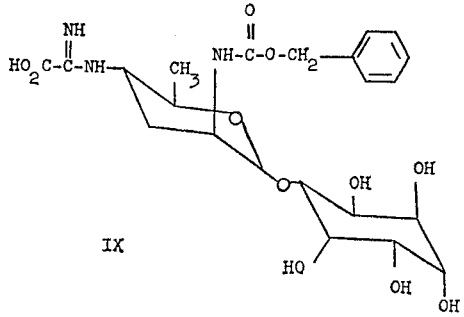

IX

Six grams (14.4 millimoles) of kasugamycin nonhydrochloride were dissolved in a solution of 2.9 grams (34.56 millimoles) of sodium bicarbonate in 544 ml. of water (0.53 percent solution) and stirred at 25° C. for 30 to 45 minutes.

Nineteen and six tenths ml. (144.5 millimoles; 24.66 grams) of carbobenzoxy chloride (Mann Research) equivalent to a 10 molar excess were added directly to the stirred solution at 25° C. Stirring was continued for 20 hours, after which time the solution was extracted with ethyl acetate to remove the small amount of insoluble material present. The aqueous phase was then concentrated in vacuo azeotropically with n-butanol. The solid material was redissolved in 25 to 50 ml. of dry methanol, and inorganic material removed by filtration. The methanolic solution was poured into 1500 ml. acetone with vigorous stirring. After approximately 15 minutes, the white solid was removed by filtration and dried in vacuo over sulfuric acid. 7.32 grams (98.7 percent theory) of title product was obtained, M.P. 175° C. The infrared (IR) and nuclear magnetic resonance (NMR) spectra were consistent with the desired structure.

*Analysis.*—Calc'd for $C_{22}H_{31}O_{11}N_3H_2O$ (percent): C, 49.71; H, 6.26; N, 7.90. Found (percent): C, 49.54; H, 5.98; N, 7.84.

(B) Preparation of 5-[2-carbobenzoxamido-2,3,4,6-tetradeoxy-4-amino-α-D-arabino-hexapyranosyl]-

[1R:2S:4R:5R:6R]

inositol (Bios C; V):

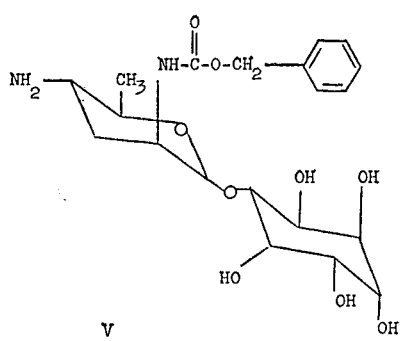

Two grams (3.89 millimoles) of compound IX were dissolved in 20 ml. of water at 25° C. with stirring. 0.67 ml. of 85 percent hydrazine hydrate (Fisher Scientific) (11.67 millimoles; 0.584 grams) was added directly at 25° C., and the mixture stirred at this temperature for 24 hours. The solution was then concentrated in vacuo with n-butanol. The solid material was redissolved in 20 to 30 ml. of hot methanol, and a yellow, methanol insoluble fraction (amounting to 250 to 350 mg.) removed by filtration. The methanolic solution was poured into 1,000 ml. of acetone with vigorous stirring. After approximately 15 minutes, the white solid was filtered and dried in vacuo over sulfuric acid to produce 1.3 to 1.4 grams (75 to 81 percent theory) of the title compound, M.P. with decomposition 195° C. to 205° C. The IR and NMR spectra were consistent with the structure of the product.

*Analysis.*—Calc'd for $C_{20}H_{30}O_9N_2 \cdot 2H_2O$ (percent): C, 50.20; H, 7.18; N, 5.86. Found (percent): C, 50.80; H, 6.65; N, 5.71.

(C) The preparation of kasugamycin dimedone and kasuganobiosamine dimedone (IIIa Bios D) is described in Examples 1, 2, 3, 4, 5 and 6 of U.S. Patent No. 3,480,614. The preparation of other Schiff bases is also described therein.

(D) 2, 3 or 4-pyridinealdoxime chloride hydrochlorides can be prepared by the procedures of Paul and Tchetitcheff, Bull. Soc. Chim. France, 2217 (1962) or by the procedure described by Paziomek and Melvin, J. Org. Chem., 26, 3769 (1961).

(E) Preparation of methyl 4-pyridinecarboximide:

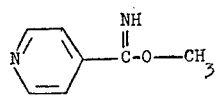

4-cyanopyridine (5.2 g.) was dissolved in 50 ml. of methanol and 270 mg. of sodium methoxide was added to the solution. The solution was allowed to stand at room temperature for 24 hours, following which carbon dioxide gas was bubbled into the solution to destroy the sodium methoxide. The solution was evaporated to dryness in vacuo and the residue was extracted with boiling cyclohexane. The product crystallized from the cyclohexane upon cooling to yield 3.5 g. of title product; M.P. 50° C.; the infrared (IR) and nuclear magnetic resonance (NMR) spectra were consistent with the structure.

(F) Preparation of methyl 3-pyridinecarboximidate or methyl 2-pyridinecarboximidate:

Substitution in the procedure of E above for the 4-cyanopyridine used therein by either an equimolar quantity of 3-cyanopyridine or 2-cyanopyridine produces respectively the methyl 3-pyridinecarboximidate or the methyl 2-pyridinecarboximidate.

(G) Substitution in the procedure of E and F above for the methanol and sodium methoxide used therein of a higher alcohol and higher sodium alkoxide, e.g., ethanol and sodium ethoxide, produced the corresponding pyridinecarboximidate.

EXAMPLE 1

Preparation of 5-[2-amino-2,3,4,6-tetradeoxy-4-(4-piperidylcarboxamidino)-α-D-arabinohexopyranosyl] - [1R: 2S:3S:3R:5R:6R]-inositol (II)

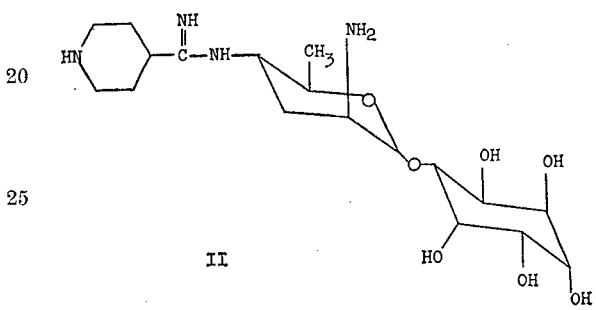

4-pyridinealdoxime chloride hydrochloride (1.93 g., 0.01 mole) was dissolved in a small amount of methanol and was added to a solution of compound V (4.4 g., 0.01 mole) in methanol (150 ml.) containing triethylamine (3.0 g., 0.03 mole). The solution was stirred at room temperature until thin-layer chromatograms [1] indicated that most of the starting material had reacted. After 48 hours the solution was evaporated to dryness at 50° C. on a rotary evaporator, redissolved in 100 ml. of 0.1 N hydrochloric acid and hydrogenated at 50 p.s.i. over 10% Pd on charcoal (0.5 g.). When no more hydrogen was absorbed, the catalyst was removed by filtration, the filtrate neutralized with a liquid anion exchange resin (LAI),[2] and the water was removed by azeotropic distillation in vacuo with n-butanol. The dry residue was dissolved in warm methanol (50 to 100 ml.), the sodium chloride solids removed by filtration, and the solids of the filtrate precipitated by the addition of 10 volumes of acetone (yield, 4.7 g.).

The crude solids (4.7 g.) were dissolved in water (25 ml.) and placed on a column (2 cm. x 30 cm.) of CG 120 cation exchange resin [3] in the hydrogen form. The column was washed with 25 ml. of water, 1,000 ml. of N HCl and again with water, and finally eluted with 0.1 N NaOH. The neutral and basic fractions were collected, dried at pH 7 in a rotary evaporator at 50° C., and again dissolved in a minimum of hot methanol. The methanol solutions were filtered and the solids therein were precipitated by addition of a large excess of acetone. The various fractions collected from the column by elution with sodium hydroxide were assayed for their minimum inhibitory concentrations (MIC) against *E. coli*. The fraction having the lowest MIC (858 mg.) was dissolved in methanol (5 ml.) and placed on a column of acid-washed alumina (0.75 cm. x 30 cm.). Different fractions were then eluted with methanol. The fraction having the best bioassay (lower MIC) against *E. coli*. (156 mg.) was characterized ---
[1] Thin-layer chromatograms were developed on silica gel G or H plates with a mixture of methylacetate, 2-propanol and ammonium hydroxide (4.5:10.5;6.0) and Avicel plates with 1-propanol, pyridine, water, acetic acid (150:100:120:30) as the developer. Spots were visualized by a ninhydrin spray or by bio-autographs.
[2] Rohm and Haas secondary amine anion exchanger.
[3] Rohm and Haas chromatographic grade sulfonic acid resin.

by IR and NMR and was determined to be consistent with the desired structure; M.P. with decomposition at about 200° C.

EXAMPLE 2

Preparation of 5-[2-amino-2,3,4,6-tetradeoxy-4-(4-piperidylcarboxamidino) - α - D-arabinohexopyanosyl]-[1R:2S:3S:4R:5R:6R]-inositol (II)

"Bios C" (9.9 g., 0.02 mole) was dissolved in 50 ml. of methanol to which solution was added 2.72 g. (0.02 mole) of methyl 4-pyridinecarboximidate and 2 g. of triethylamine. The solution was refluxed for eight hours. When thin layer chromatography indicated the continued presence of unreacted "Bios C," a second equivalent of the imidate was added and the pH was adjusted to about pH 7 with glacial acetic acid. The solution was evaporated in vacuo, the residue then dissolved in 1 N hydrochloric acid and hydrogenated at 50 lb./in.$^2$ over 10% palladium on charcoal (500 mg.).

After the hydrogen uptake ceased, the catalyst was removed by filtration and the filtrate was neutralized by admixture with liquid resin LA1.

The aqueous solution was evaporated in vacuo and the residue was extracted with hot methanol (75 ml.). The methanolic solution was poured into 1 liter of acetone and the resultant precipitate was collected by filtration, then air dried to yield 6 g. of solid product which was then assayed against *E. coli.* according to the procedure described in columns 8 and 9 of U.S. Pat. No. 3,480,614.

3.5 g. of the material thus obtained was dissolved in a minimum quantity of water and placed on a column (1.5 x 25 cm.) of G. C. 120 ion exchange resin. The column was washed with water and 1 N HCl and then eluted with 0.1 N sodium hydroxide. The various fractions collected were evaporated in vacuo and assayed against *E. coli.* Those fractions assaying at greater than 600 mcg./mg. as compared to kasugamycin as standard (381 mg. total solids) were dissolved in hot methanol and chromatographed on acid-washed alumina. The most active fraction thus obtained had an activity of about 1400 mcg./mg. as compared to kasugamycin against *E. coli.*

Table I illustrates the activity of the purified compound when assayed against a selected variety of bacteria. The compounds 5-[2-amino-2,3,4,6-tetrodeoxy-4-acetamidino-α - D - arabinohexopyranosyl] - [1R:2S:3S:4R:5R:6R]-inositol (X) was included for comparison purposes. (Example 10, U.S. Patent No. 3,480,614).

TABLE I

Minimum Inhibitory Concentrations (MIC) in mcg./ml.

| Organism | Bristol code | Compound X | Compound II |
|---|---|---|---|
| Ps. aeruginosa | A-9925 | 32 | ≤2 |
| Ps. aeruginosa | A-9931 | 16 | ≤2 |
| E. coli Juhl | A-15119 | 125 | 63 |
| E. coli Squibb | A-15010 | 8 | ≤2 |
| E. coli BRL | A-0559 | 125 | 16 |
| K. pneumoniae | A-9867 | 16 | 4 |
| K. pneumoniae | A-9977 | 2 | ≤2 |
| K. pneumoniae—50% serum | A-9977 | 4 | 4 |
| Pr. mirabilis | A-9900 | 1,000 | 32 |
| Pr. morganii | A-0636 | 125 | ≤2 |
| Pr. morganii | A-15153 | 125 | 8 |
| Sal. enteritidis | A-0531 | 16 | 4 |
| Sal. paratyphi | A-9530 | 4 | ≤2 |
| Sal. typhosa | A-9498 | 8 | ≤2 |
| Ps. aeruginosa | A-9843A | 4 | 4 |
| Ps. aeruginosa | A-9930 | 8 | ≤2 |
| Ser. marcescens | A-9933 | 4 | ≤2 |
| Ent. aerogenes | A-9432 | 32 | 4 |

EXAMPLE 3

Preparation of 5-[2-amino-2,3,4,6-tetradeoxy-4-(2-piperidylcarboxamidino) - α - D - arabinohexopyranosyl]-[1R:2S:3S:4R:5R:6R]-inositol 2-pyridinealdoxime chloride hydrochloride (1.56 g., 0.008 mole) was reacted with Bios C (4.4 g., 0.01 mole) in water (100 ml.), the pH being adjusted to 7.0 with N sodium hydroxide. After two hours stirring at room temperature another portion (1.56 g.) of the oxime chloride was added, the mixture again neutralized, and stirred for 19 hours.

The mixture was acidified to pH 3.0 with N hyrochloric acid, 10% Pd on charcoal (500 mg.) was added, and the mixture was hydrogenated at 50 p.s.i. for 5 hours. The mixture was filtered, neutralized with LA-1 resin (2 ml.), and dried on a rotary evaporator. The residue was dissolved in methanol (15 ml.), filtered, and precipitated by the addition of acetone (600 ml.). This crude material (2.4 g.) had a potency of 2160 μ/mg.

Purification as in Example 1 gave a solid (103 mg.) with 4780 μ/mg. as compared to kasugamycin decomposing at 187–190°. The spectra IR and NMR were compatible with the structure.

EXAMPLE 4

Preparation of 5-[2-amino-2,3,4,6-tetradeoxy-4-(3-piperidylcarboxamidino) - α - D - arabinohexopyranosyl]-[1R:2S:3S:4R:5R:6R]-inositol 3-pyridinealdoxime chloride hydrochloride (1.56 g., 0.0081 mole) was reacted with "Bios C" (4.43 g., 0.01 mole) in water (100 ml.), the pH being adjusted to 7.0 with N sodium hydroxide. After two hours stirring at room temperature another portion (1.56 g.) of the oxime chloride was added, the mixture again neutralized, and stirred for 19 hours.

The mixture was acidified to pH 3.0 with N hydrochloride acid, 10% Pd on charcoal (500 mg.) was added, and the mixture was hydrogenated at 50 p.s.i. for 5 hours. The mixture was filtered, neutralized with LA-1 resin (2 ml.), and dried on a rotary evaporator. The residue was dissolved in methanol (15 ml.), filtered, and precipitated by the addition of acetone (600 ml.). The crude material weighed 1.8 g.

Purification as in Example 1 gave 326 mg. of title product having an IR and NMR spectra consistent with the structure.

EXAMPLE 5

Preparation of 5-[2-amino-2,3,4,6-tetradeoxy-4-(2 - pyridyl-N-hydroxycarboxamidino) - α - D - arabinohexopyranosyl]-[1R:2S:3S:4R:5R:6R]-inositol

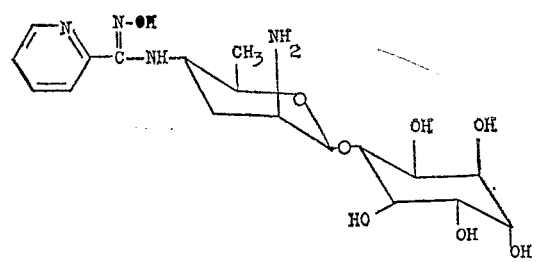

2-pyridinealdoxime chloride hydrochloride (1.56 g., 0.0081 mole) was reacted with "Bios D" (4.30 g., 0.01 mole) in 100 ml. of water, the pH being adjusted to 7.0 with 1 N sodium hydroxide. After two hours of stirring at room temperature another 1.56 g. portion of the oxime chloride was added, the solution was again neutralized and then stirred for 19 hours. The water solution was removed in vacuo. The crude solids so isolated were dissolved in a slight excess of saturated bromine water (300 ml., until the bromine color persisted). The 2,2-dibromo-5,5-dimethyl-cyclohexane-1,3-dione precipitate was collected by filtration and the aqueous solution was neutralized and the water removed in vacuo. The residue was dissolved in methanol (25 ml.) and poured into acetone (600 ml.). The dry precipitate weighed 4.06 g. and assayed 380 μ/mg. Purification by chromatography as in Example 1 on CG120 gave 250 mg. of material with 2000 μ/mg. of activity against *E coli*. The IR and NMR of the solid are consistent with the title structure.

EXAMPLE 6

Preparation of 5-[2-amino-2,3,4,5-tetradeoxy-4-(4-piperidylcarboxamidino) - α - D - arabinohexopyranosyl]-[1R:2S:3S:4R:5R:6R:]-inositol Ethyl 4-pyridinecarboximidate (5.2 g.) was added to a solution of 10.0 g. of "Bios D" in 150 ml. of methanol. The pH was adjusted from 1.5 to 7.0 by the addition of an approximately 1 N sodium methoxide solution in methanol. The solution was refluxed for 2 hours. After cooling, a second 5.2 g. portion of the imido ester was added and the pH adjusted to 7.6. Refluxing was continued for 2 hours more. The same procedure was repeated a third time and fourth time. After the addition of the fourth increment of imido ester, the mixture was heated at reflux for approximately 17 hours. The mixture was cooled and then concentrated in vacuo to dryness on the rotary evaporator. The residue was dissolved in 300 ml. H₂O and filtered. The filtrate was washed with three 80 ml. portions of chloroform which were discarded.

Bromine was added with stirring to the aqueous solution until a strong bromine color persisted for a one-half hour period. At this point the reaction mixture was set aside for two days at room temperature.

The mixture was then filtered and the filtrate concentrated in vacuo to dryness. Absolute ethanol was added to the residue and distilled off three times in order to remove traces of water. The residue was then dissolved in a minimum amount of methanol and the product precipitated by the addition of 4–5 volumes of acetone and ether. The precipitate was recovered by filtration, partially dried in the air and then placed in the vacuum desiccator for complete drying. A yield of 15.9 g. was obtained; plate assay vs. *E. coli*, 178 μg./mg.

A 15.0 g. portion of these solids was dissolved in 40 ml. H₂O and added to the top of a chromatographic column (50 x 750 mm.) containing about 550 ml. Dowex 50–4X (H⁺) resin. The column was then washed with 3.5 l. H₂O, 3.3 l. 1 N HCl and development then started with 0.1 N NaOH solution. The product could be seen as a yellow band as it moved down the dark brown column. As the yellow zone came off the column it was collected in a 250 ml. portion of 1 N HCl. A cut of 3750 ml. was collected. It was neutralized with 1 N NaOH solution to pH 6.0. The solution was then concentrated in vacuo to dryness. The product was recovered in the usual manner by dissolving in a minimum volume of methanol and precipitating with a several-fold volume of acetone and ether. A yield of 6.6 g. was obtained.

The IR and NMR were consistent for the structure of 5-[2 - amino - 2,3,4,6 - tetradeoxy-4-(4-pyridylcarboxamidino) - α - D - arabinohexopyranosyl]-[1R:2S:3S:4R:5R:6R]-inositol.

A 500 mg. sample of this pyridyl derivative dissolved in 25 ml. of 0.1 N HCl was mixed with 100 mg. of 10% Pd on carbon and placed in the Parr hydrogenation apparatus at 50 lb./in.² hydrogen for a period of 4 hours. The catalyst was then removed by filtering and the filtrate concentrated to dryness in vacuo. The residue was dried by adding absolute ethanol two times and then distilling to dryness in vacuo. The residue was then dissolved in a minimum volume of methanol and precipitated by the addition of about five volumes each of acetone and ether. The product was recovered by filtration, washed with a small volume of ether and then air dried; yield 435 mg., 520 μg./mg. The IR and NMR were consistent with the structure of 5-[2-amino-2,3,4,6-tetradeoxy-4-(4-piperidyl-carboxamidine) - α - D - arabinohexopyranosyl]-[1R:2S: 4R:5R:6R]-inositol.

EXAMPLE 7

Preparation of 5-[2-amino-2,3,4,6-tetradeoxy-4-(2-piperidylcarboxamidino) - α - D - arabinohexopyranosyl]-[1R:2S:3S:4R:5R:6R]-inositol A 500 mg. sample of 5-[2-amino-2,3,4,6-tetradeoxy-4-(2-pyridyl - N - hydroxycarboramidino)-α-D-arabinohexopyranosyl]-[1R:2S:3S:4R:5R:6R]-inositol (Example 5) dissolved in 25 ml. of 0.1 N HCl mixed with 100 mg. of 10% palladium on carbon and hydrogenated at 50 lb./in.² for a period of 4 hours. The catalyst removed by filtration and the filtrate concentrated in vacuo. The residue was fractionally precipitated from a methanol-acetone-ether solvent system to yield the title product.

I claim:

1. A compound having the formula

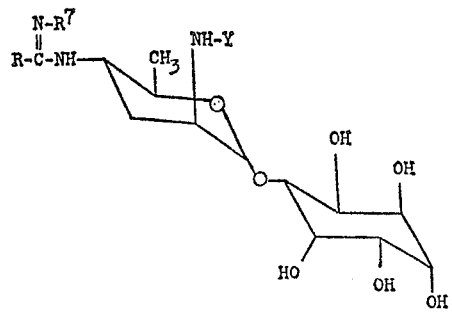

wherein R is 2,3 or 4-piperidyl, or 2,3 or 4-pyridyl; Y is hydrogen or a radical of the formula

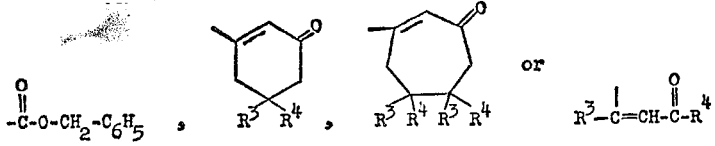

in which R³ and R⁴ are alike or different and each is hydrogen or (lower)alkyl; and R⁷ is hydrogen or —OH; or a pharmaceutically acceptable nontoxic acid addition salt thereof.

2. The compounds of claim 1 wherein Y and R⁷ are each hydrogen.

3. The compounds of claim 1 wherein Y and R⁷ are each hydrogen and R is 3 or 4-piperidyl, or 3 or 4-pyridyl.

4. The compounds of claim 1 wherein Y and R⁷ are each hydrogen and R is 4-piperidyl or 4-pyridyl.

5. The compound of claim 1 wherein Y and R⁷ are each hydrogen and R is 4-piperidyl; or a mono-, di-, or trihydrochloride salt thereof.

6. The compounds of claim 1 wherein Y is a radical of the formula

and R⁷ is hydrogen or —OH.

7. The compounds of claim 1 wherein Y is a radical of the formula

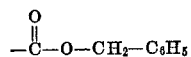

and R⁷ is hydogen or —OH.

8. The compounds of claim 1 wherein Y is a radical of the formula

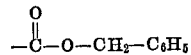

and R⁷ is hydrogen.

9. The compounds of claim 1 wherein Y is a radical of the formula

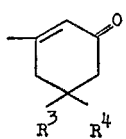

and R⁷ is hydrogen or —OH.

10. The compounds of claim 1 wherein Y is a radical of the formula

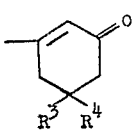

and R⁷ is hydrogen.

11. The compounds of claim 1 wherein Y is a radical of the formula

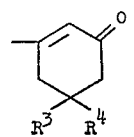

and R⁷ is —OH.

12. The compounds of claim 1 wherein Y is a radical of the formula

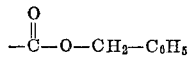

and R⁷ is —OH.

13. The compounds of claim 1 wherein Y is hydrogen and R⁷ is —OH.

14. The compounds of claim 1 wherein Y is hydrogen, R⁷ is —OH and R is 3 or 4-piperidyl, or 3 or 4-pyridyl.

15. The compounds of claim 1 wherein Y is hydrogen, R⁷ is —OH and R is 4-pyridyl or 4-piperidyl.

16. The compound of claim 1 wherein Y is hydrogen, R⁷ is —OH and R is 4-pyridyl.

17. The compound of claim 1 wherein Y is hydrogen R⁷ is —OH and R is 4-piperidyl.

References Cited

UNITED STATES PATENTS 3,480,614   11/1969   Cron et al. _____ 260—210 R

LEWIS GOTTS, Primary Examiner

J. R. BROWN, Assistant Examiner

U.S. Cl. X.R.

260—296 AE, 999, 210 AB